(12) United States Patent
Bishop et al.

(10) Patent No.: US 6,307,696 B1
(45) Date of Patent: Oct. 23, 2001

(54) DIGITAL ZERO-PHASE RESTART CIRCUIT

(75) Inventors: Andrew Bishop, Shewsbury, MA (US); Eduardo G. Veiga, Sunnyvale, CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/306,222

(22) Filed: May 6, 1999

(51) Int. Cl.[7] .................................................. G11B 5/09
(52) U.S. Cl. ................................................................ 360/51
(58) Field of Search ........................ 360/51, 53; 375/376, 375/375, 374, 373, 371, 362; 714/769, 770, 774, 775, 798

(56) References Cited

U.S. PATENT DOCUMENTS

| | | |
|---|---|---|
| 5,341,249 | 8/1994 | Abbott et al. . |
| 5,345,342 * | 9/1994 | Abbott et al. ..................... 360/77.08 |
| 5,835,295 * | 11/1998 | Behrens ................................. 360/51 |
| 5,905,601 * | 5/1999 | Tsunoda ................................. 360/53 |
| 6,067,198 * | 5/2000 | Zuffada et al. ........................ 360/51 |

OTHER PUBLICATIONS

The Illustrated Dictionary of Electronics, Fifth Edition, p. 453, by Rufus P. Turner et al, published Dec. 1991, by McGraw–Hill, Inc.*

* cited by examiner

*Primary Examiner*—Alan T. Faber
(74) *Attorney, Agent, or Firm*—David M. Sigmond

(57) ABSTRACT

An all digital timing loop is employed in a hard disk drive read channel for improved timing performance. Synchronizing the read channel to a sinewave preamble pattern at the beginning of a servo or data read operation is accomplished by first determining an accurate initial estimate of phase angle, and loading that phase value into the digital phase lock loop phase interpolator without having to halt and restart the sample clock. The timing loop synchronizes to the preamble input pattern very quickly so that timing overhead is reduced. The initial phase estimate is formed by accumulating even and odd ADC samples over a selected integration period, and using those values to access an arctan lookup table. Since ratios of even and odd ADC samples are used, gain variations and other analog tolerance issues are avoided.

25 Claims, 10 Drawing Sheets

DIGITAL ZERO-PHASE RESTART CIRCUIT

TECHNICAL FIELD

The present invention is in the field of magnetic recording of digital data and, more specifically, concerns rapid synchronization in the timing loop of a magnetic read channel such as those found in computer disk drives.

BACKGROUND OF THE INVENTION

Hard disk drives have been in use for nearly twenty years and are found in most computers, as well as other types of electronic systems where non-volatile recording of large quantities of digital data is required. Many techniques have been developed over the years to improve the performance of hard disk drives, including magneto-resistive read/write heads, various RLL encoding schemes and the now well-known if not ubiquitous PRML (partial response maximum likelihood) read channel. One of the important improvements adopted early on in disk drive evolution was the "servo wedge"—areas on the magnetic recording surface where timing and control information are stored, generally interspersed between encoded user data storage regions. For example, a typical data track on a hard disk includes a series of spaced-apart data regions, alternating with embedded servo regions. The data regions are typically encoded according to a PRML code specification. There may be on the order of 100 or more servo regions embedded within each concentric data track, as further explained later with reference to the drawings. Each servo region includes information used by the head position servo for precisely positioning and tracking the head over the particular track. Each servo region also includes a "preamble pattern," typically a repeating pattern of plus and minus magnetic flux transitions that will reproduce as a sine wave analog signal in the read channel for the purpose of synchronizing the servo demodulator phase locked loop (PLL) to the servo position data stored on the recording surface. Interspaced with the servo wedges are data sectors where the digital data is stored on the magnetic media. Each data sector likewise includes a preamble sine wave pattern that is used for synchronizing the read channel PLL to data being read off the magnetic disk. A representative disk drive that employs the technologies summarized above is described in detail in commonly-assigned U.S. Pat. No. 5,345,342 entitled "DISK DRIVE USING PRML SYNCHRONOUS SAMPLING DATA DETECTION AND ASYNCHRONOUS DETECTION OF EMBEDDED SECTOR SERVO."

At the beginning of a disk read operation or, more precisely, in preparation for each data read operation or servo operation, the read channel timing loop circuitry is re-synchronized to the current preamble pattern. In prior art, this timing acquisition is aided by a combination of either (1) adaptive or two-stage phase-locked loop (PLL) filters; and/or (2) analog Zero-Phase Restart (ZPR) techniques, according to which the voltage-controlled oscillator (VCO) is held for a short time, and then released so as to be aligned with the incoming analog read signals.

Adaptive PLL loop filters improve acquisition performance by increasing the loop bandwidth for a short duration to achieve phase lock; at the cost of increased phase jitter. Then the loop bandwidth is reduced to the steady state value required to meet allowed jitter tolerance. The acquisition improvement is a function of the size of the increase in the loop bandwidth, which in turn is limited by the size of disturbance that the PLL can tolerate without completely losing synchronization.

Analog ZPR circuits function by holding the analog VCO for a short time, and then releasing the oscillator so as to align the VCO phase with the input signal phase. Analog ZPR accuracy is limited by the tolerances of the analog circuitry. The critical tolerances that affect accuracy include that of the sensor that detects the input signal phase; the hold-off circuit that stops the VCO; and the reaction delay time of the controlling circuitry. All of these tolerances conspire to limit the accuracy achievable using the analog hold technique. In view of the foregoing background, the need remains for improvements in rapidly acquiring synchronization to the preamble pattern in a disk drive read channel. Acquisition performance is critically important in a magnetic read channel because the time spent in acquiring or synchronizing to the input signal reduces the time that could otherwise be spent reading user data off the disk. And similarly reducing the size of the preamble pattern translates to better utilization of the recording surface area for user data.

SUMMARY OF THE INVENTION

The present invention seeks to improve timing acquisition performance in a digital PLL by accurately (and quickly) estimating the initial input signal phase, and then initializing the VCO phase to that of the input signal before the PLL commences normal operation. This step function or "jump start" to an accurately estimated phase value enables the PLL to settle and lock very quickly. Simulations and measurements show settling times of about 0.25 microseconds as compared to about 3.5 microseconds with the new ZPR feature turned off.

One aspect of the present invention is an all-digital circuit for improved timing acquisition. Specifically, the invention leverages an interpolating digital timing loop to create an all-digital ZPR circuit that can initialize the correct sampling phase with very high accuracy. The new circuit does not rely on analog circuit tolerances as in the prior art. The improved ZPR function preferably is used in conjunction with a two-stage PLL loop filter to improve timing acquisition performance, although it is useful in a PLL with a first order loop filter as well. The invention takes advantage of a PLL with a digital integrator and phase interpolator in place of the conventional analog VCO.

The new ZPR circuit calculates the initial phase of the input signal, based on an ARCTAN lookup table, although equivalent implementations could be used (RAM, logic, etc.). The arctan lookup is based on a ratio of accumulated sine and cosine components of the input preamble signal. The sampling clock phase is then shifted by the calculated phase error, and then two-stage timing acquisition proceeds. Since the calculation is based on a ratio of accumulated values, gain variations cancel one another out of the calculation, as do analog component variations. The net result of this new ZPR function is an initial phase error that is less than approximately 15% of a symbol interval prior to timing acquisition in the worst case; typically this is nearer to 5%.

Additional objects and advantages of this invention will be apparent from the following detailed description of preferred embodiments thereof which proceeds with reference to the accompanying drawings.

DETAILED DESCRIPTION OF PREFERRED EMBODIMENT

Figure 1A:
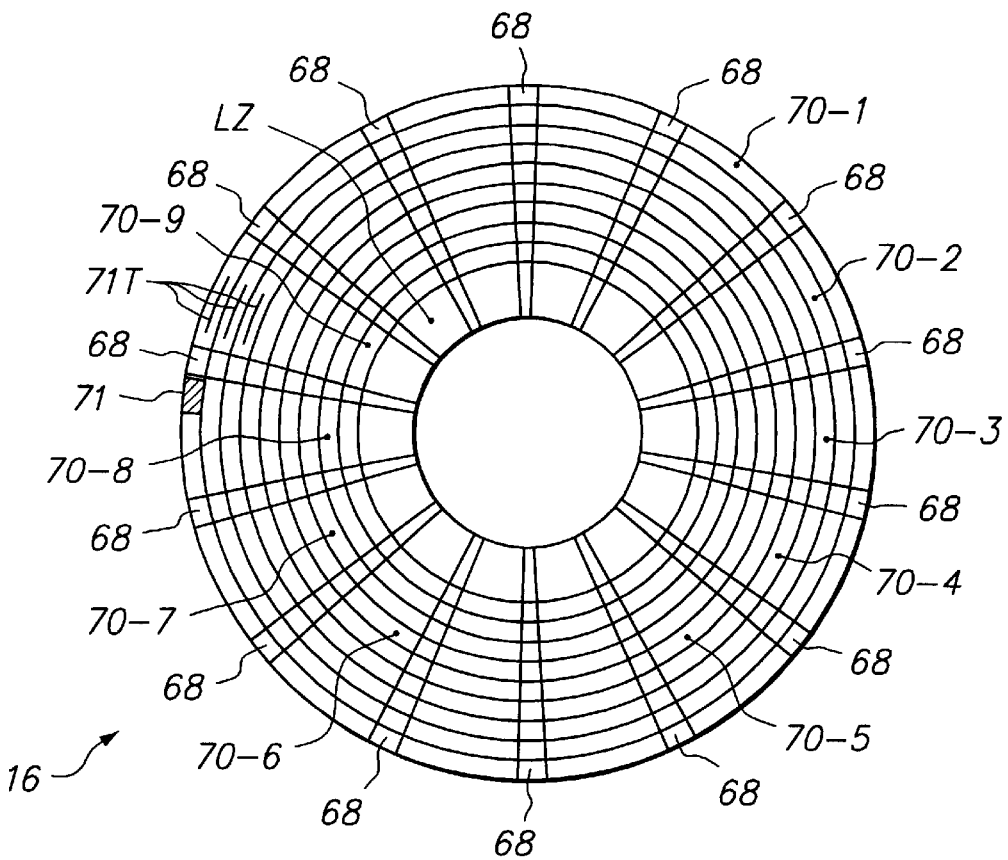
FIG. 1 is a simplified diagram of a recording pattern formed on a data storage surface such as a magnetic recording surface of a hard disk drive (prior art).

FIG. 1A is a simplified diagram of a recording pattern formed on a data storage surface such as the magnetic recording surface of a hard disk drive. Data recording patterns of this type are known in the prior art and described, for example, in the '342 patent mentioned above. In this figure, the storage disk surface 16 includes plurality of concentric data tracks 71 which are preferably arranged into a plurality of data recording zones 70 between an inner landing zone area LZ and a radially outmost peripheral data track zone 70-1. The various zones are numbered 70-1 through 70-9, although in practice more zones may be used. Each data zone has a bit transfer rate selected to optimize areal transition domain densities for the particular radius of the zone.

Figure 1B:
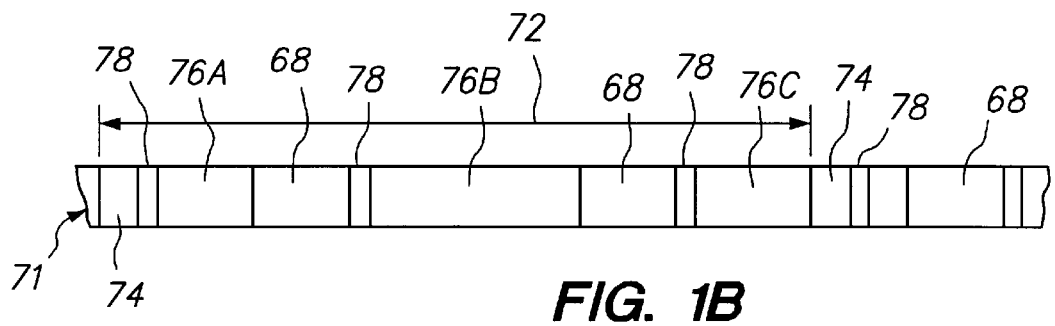
Figure 1C:
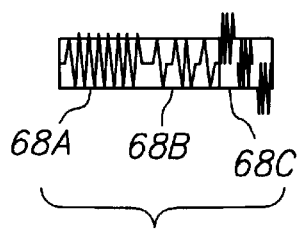
Figure 1D:
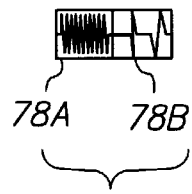

FIG. 1A also depicts a series of radially extended embedded servo sectors 68 which are equally spaced around the circumference of the disk surface 16. As shown in FIG. 1C, each servo sector includes a servo preamble field 68A, a servo identification fields 68B and other servo burst is for track alignment and the like. It may be noted that the servo wedge arrangement described here is written onto the disk using the same magnetic recording means as is used to record user data. In other words, the sector formatting is not hard coded on the disk surface.

Figure 2:
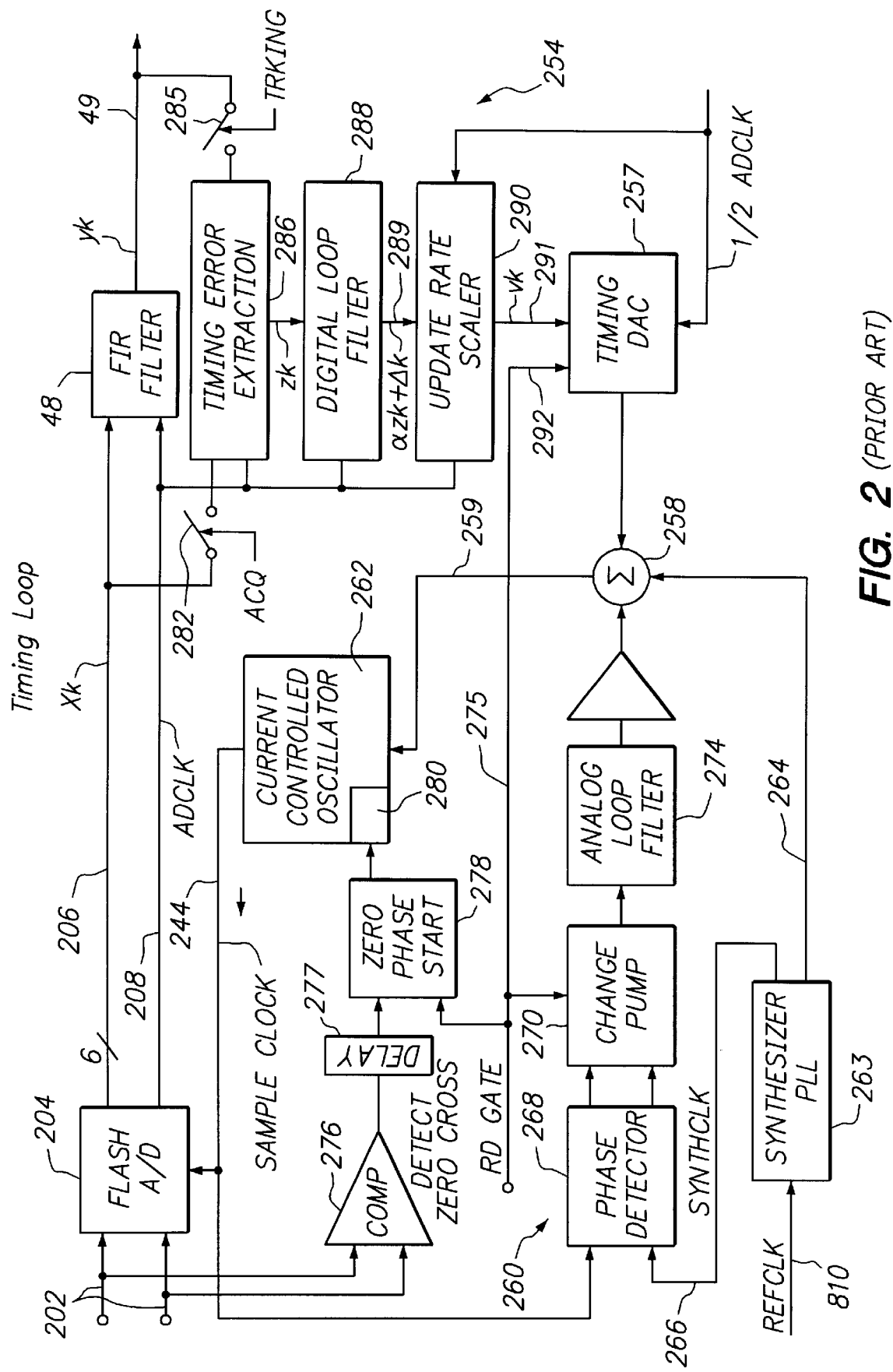
FIG. 2 is a block diagram of timing loop portions of a disk drive read channel (prior art).

FIG. 2 is a block diagram of the timing loop portions of a prior art disk drive read channel described in more detail in the '342 Patent. First, we briefly summarize operation of the timing loop during the normal steady state. By "steady state" we mean a time during which the channel is reading a stream of encoded user data or servo wedge control information rather than preamble patterns. In a sampled data detection system such as a PRML system, the coded analog information stream read back from the data storage surface is sampled by a flash A/D converter 204. The conversion process includes quantization according to the number of bits resolved by the A/D. An automatic gain loop, not directly pertinent here, is used to adjust the amplitude of the analog information stream at the inputs 202 in order to utilize the full dynamic range of the A/D converter 204.

The timing loop operates generally as follows. FIG. 2 illustrates a multi-mode timing loop comprising the combination of an analog-based timing loop including the analog phase lock loop control circuitry, indicated generally at 260, sunning junction 258, and the ICO 262 (current control oscillator) which provides the sample clock signal 244 to control sampling by the flash AID 204. The second, digital-based timing loop includes a digital timing control circuit 254, a timing DAC 257, the summing junction 258 and the ICO 262. The A/D converter 204 provides a common path for both timing loops. The multi-mode timing loop has two main operating modes: non-read and data-read. During non-read, the timing is controlled by the analog based timing loop. During read mode, when timing is controlled through the digital timing control circuit 254, there are two sub-modes: acquisition and tracking.

Read mode is entered when user data is to be read from the disk surface. At the beginning of every recorded data segment e.g., 76A, 76B and 76C in FIG. 1B, the data header 78 includes a constant frequency preamble pattern field 78A. This pattern is recorded in accordance with a selected square wave saturated recording current. During playback, the read head responds to the detected flux transitions so that the resulting playback signal resembles a sinewave of known frequency. This "preamble pattern" is used to lock up the timing loop to a good initial starting phase, and to synchronize the read clock to the data pattern to be read. (The playback response of the preamble pattern is also used to set the initial gain settings.) At the outset of the acquisition mode, the flash A/D converter 204 is sampling the incoming waveform at approximate sample locations, depending upon the accuracy of zero phase start circuitry.

PLL Operation

Figure 4:
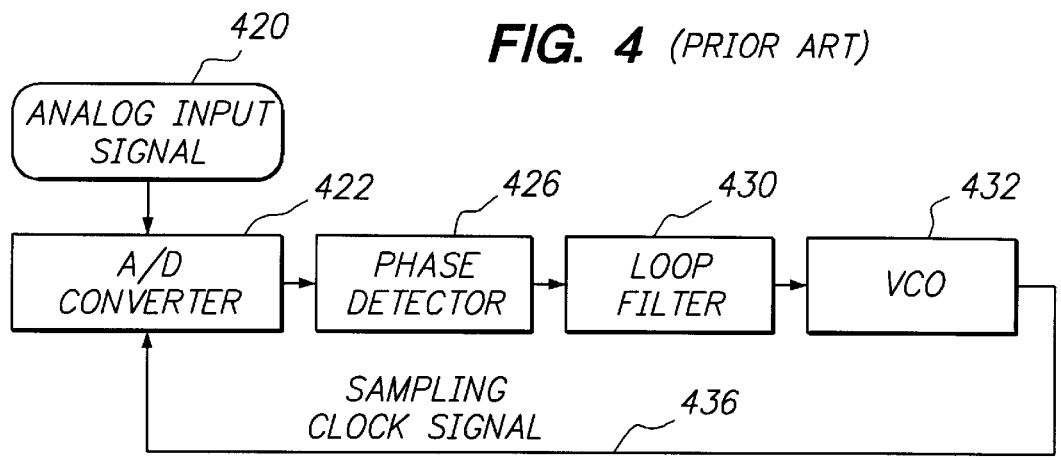
FIG. 4 is a simplified block diagram of an analog phase lock loop (PLL) timing loop circuit (prior art).

FIG. 4 is simplified block diagram of an analog phase lock loop (PLL) timing loop circuit of the type described above. This figure provides a simplified illustration of a sample phase lock loop. This type of PLL includes four function blocks: First, the A/D converter 422 samples an analog input signal from the read head as mentioned above. The A/D converter samples the input signal 420 once per period of the sampling clock signal 436. A phase detector 426 calculates a phase error of the input signals with respect to the phase of the sampling clock to produce an error signal. A loop filter 430 controls the dynamics of the closed-loop system. Finally, an analog VCO (voltage controlled oscillator) outputs a sampling clock waveform with a frequency proportional to its input control signal which in turn is directly related to the error signal provided by the phase detector 426, as is known in prior art.

In an ideal locked state, the sampling clock signal phase is aligned with the analog input signal 420; and the PLL tracks the phase of the input signal. However, upon startup, the input signal's phase is unknown relative to the sampling clock phase. The PLL acquires the input signal phase over a length of time called the acquisition time (Ta).

Zero Phase Start

In order to reduce the time required for acquiring preamble timing, and thereby increase storage area available for user data, it is necessary to provide rapid resynchronization of the current-controlled oscillator 262 of FIG. 2 to incoming data upon switching from non-read mode to read mode, i.e. at the beginning of a servo wedge or a user data block. (For example, data segment preamble 78A or servo sector preamble 68A in FIG. 1.) One way to reduce the time to acquire correct phase, as mentioned above, is to momentarily stop the current controlled oscillator 262 and then restart it in proper phase alignment with the incoming analog sinewave signal being read back from the disk during preamble time.

Peak detection techniques have been used to synchronize a voltage controlled oscillator element of a data separator phase locked loop by virtue of the fact that the incoming read raw data has been differentiated. The edges associated with the differentiated analog waveform are therefore available to establish correct phase timing and lock. In a sampled data system, however, the analog signal is not differentiated. Rather, it is sampled by the flash A/D converter 204. It is essential to sample the analog waveform at the proper location, denoted SL in the waveforms illustrated in FIG. 3, graph A.

Figure 3:
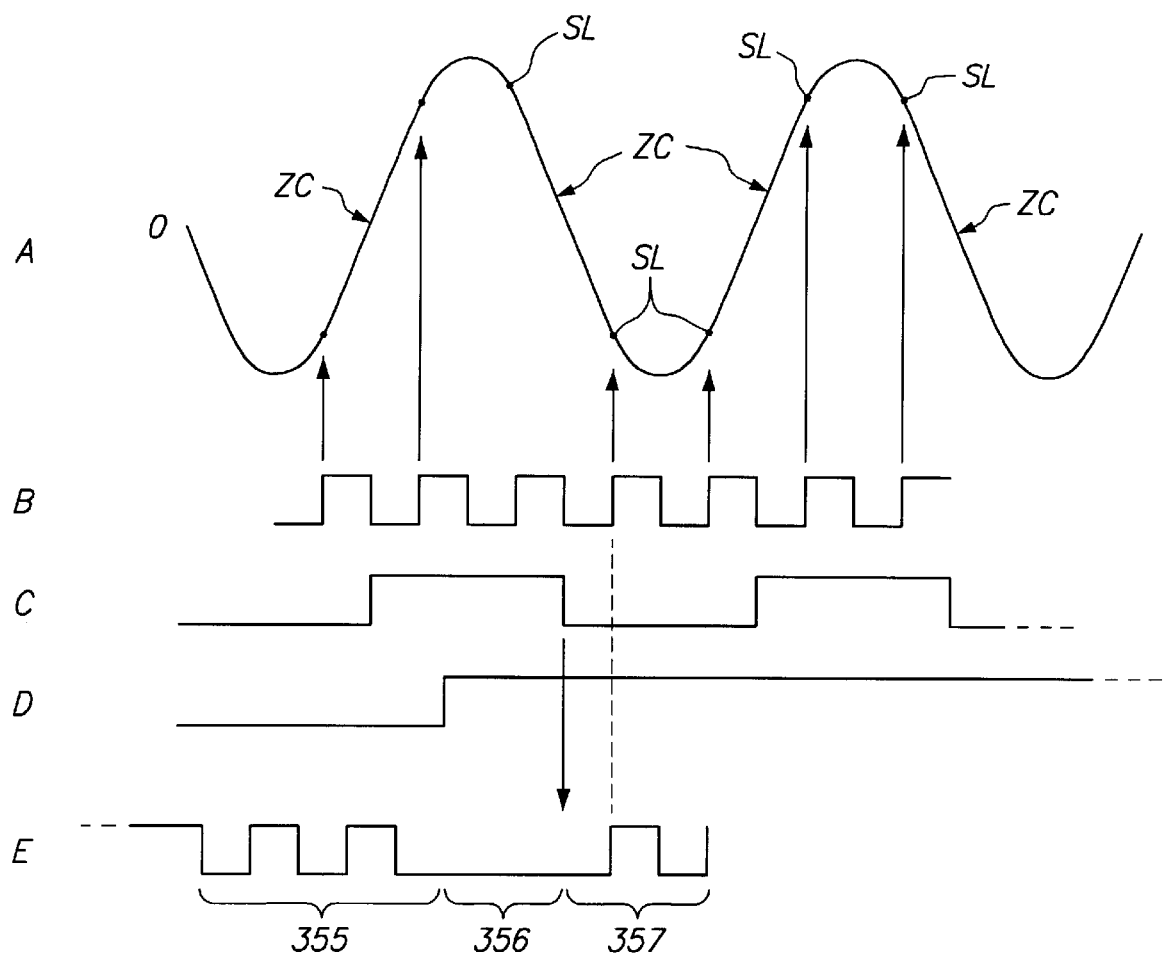
FIG. 3 is a series of waveforms illustrating operation of the timing loop of FIG. 2 (prior art).

Since the preamble field will be reproduced by the selected data transducer head as an approximate sinewave, shown in FIG. 3, graph A, it is apparent by inspection that there is a fixed time relationship between the ideal sample locations SL and the zero crossings ZC of this waveform. Thus, by detecting the location of zero crossings of the waveform, a timing loop can be established which can be used to controllably inhibit the current-controlled oscillator 262. One way to detect zero crossings is by using a comparator, such as the differential analog comparator 276 shown in FIG. 2. The inputs to comparator 276 are differential components of the analog signal presented at the input of the flash A/D converter 204. Ideally, the comparator 276 generates a waveform which is a digital equivalent of the preamble sinewave. The ideal digital equivalent is graphed as waveform C of FIG. 3 in relation to a synchronized bit clock, waveform B, and the incoming sinewave of the preamble field, waveform A. In this example, the rising edge of the waveform A sinewave causes the comparator output to become true as it passes through the rising edge zero crossing ZC, and to become false as it passes through the falling edge zero crossing ZC.

In practice, there are logic circuit delays resulting from the operation of the comparator 276, and from a zero phase start logic array 278. The fixed duration delays associated with signal latencies in the comparator 276 and zero phase start logic 278 are lumped and denoted by the delay element 277. If one were using a single frequency, rather than a plurality of frequencies adapted to the radial data zones 70-1 through 70-9, the delay element 277 could be readily tuned to the precise delay length to create the ideal phase relationship illustrated in FIG. 3, graph C, with the FIG. 3, graph A waveform. However, with programmable data rates, the delay ideally is provided with a delay component which is a function of the particular frequency.

This variable delay component can be incorporated into the structure of the current controlled oscillator 262 and is denoted by the element 280. Thus, when the fixed delay 277 is summed with the variable delay 280, the resultant achieved is the desired phase relationship between the incoming differential analog signal and the ICO output (SAMPLED CLOCK). In operation, a synthesizer 263 generates the nominal write clock during non-read times, and that clock is used to control the current controlled oscillator 262 via the analog timing loop 260 as explained. The clock frequency, which is not phase locked with the incoming data, is depicted as a segment 355 of waveform E of FIG. 3. The moment that the read gate signal RDGATE on the path 275 is asserted, shown as waveform D of FIG. 3, the operation of the oscillator 262 is momentarily paused, as at a segment 356 of waveform E. This pause, which may be of a variable length covering a fraction to several cycles of the waveform A signal, continues until the comparator output goes false. On the falling edge of the comparator signal, waveform C, the current controlled oscillator clock is restarted as shown at a segment 357 of waveform E of FIG. 3. Therein, the clock cycle is shown to be delayed by a fixed delay increment and a variable delay increment.

The samples are then taken coincident (within some error margin) with the rising edge of the phase-adjusted output clocking signal ADCLK (208). Following the zero phase start process, any remaining phase error is removed during the timing acquisition mode of the dual mode timing loop, as previously explained. Still, this settling takes valuable time. The circuitry described above is subject to the types of analog circuit tolerances described earlier in the background section, and therefore the zero-phase start is fairly rough. Substantial improvement can be achieved using the concepts described next. Indeed, most of the analog PLL circuitry can be obviated by using the present invention.

Figure 5:
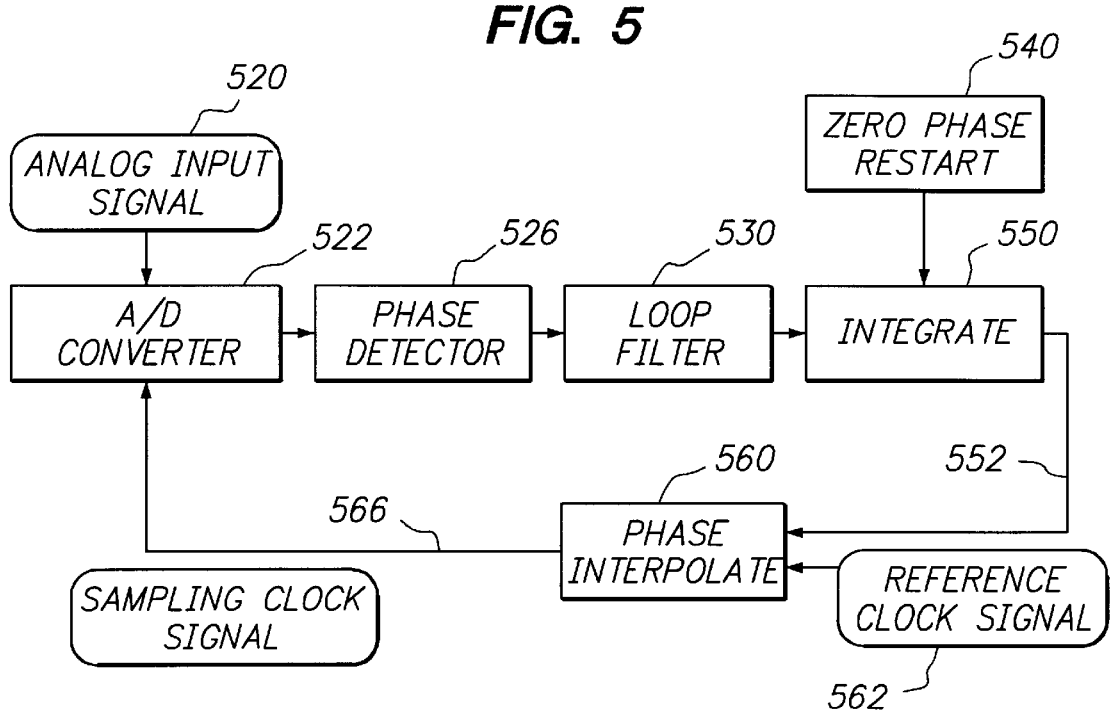
FIG. 5 is a simplified block diagram of a digital VCO (DVCO) based timing loop circuit in accordance with the present invention.

FIG. 5 is a simplified block diagram of a digital VCO based timing loop circuit in accordance with the present invention. The digital timing loop, in the normal steady state (as distinguished from restart) operates generally as follows. The analog input signal 520 is provided to A/D converter 522 as before. The converter provides digital samples at the sampling clock rate to a phase detector 526. The phase detector 526 compares the phase of the analog input signals to the phase of the sampling clock signal to form a phase error signal, which may be, for example, a 5-bit quantity. The phase error is input to a loop filter block 530 in which the amplitude of the phase error may be scaled. Optionally, the loop filter block can also include an accumulator for integrating a frequency error signal. In that arrangement, the accumulated frequency error signal is summed together with the scaled phase error signal to form the loop filter output signal. Either way, the resulting error signal, which may be, for example, an 8 or 9-bit quantity, is input to an integrate block 550.

The integrate block 550 includes an accumulator for continually summing the phase error signal. The accumulated phase error signal is then scaled, and may be smoothed, and is output as a phase select signal (PHSEL) via path 552. The phase error signal is input to a phase interpolator block 560 where it is used to (digitally) adjust the phase of the reference clock signal 562 to produce the sampling clock signal 566 that drives the A/D sampling at the phase determined by the PHSEL input. As noted before, this is a steady state operation.

At the outset of a read operation (data or servo) however, when timing is to be acquired from the preamble pattern, the input signal may be grossly out of phase with the sampling clock which initially is just the phase of the free-running reference clock signal 562. A zero-phase restart (ZPR) circuit 540 is used at such times to "jump" the timing loop into close phase alignment as follows.

Figure 6:
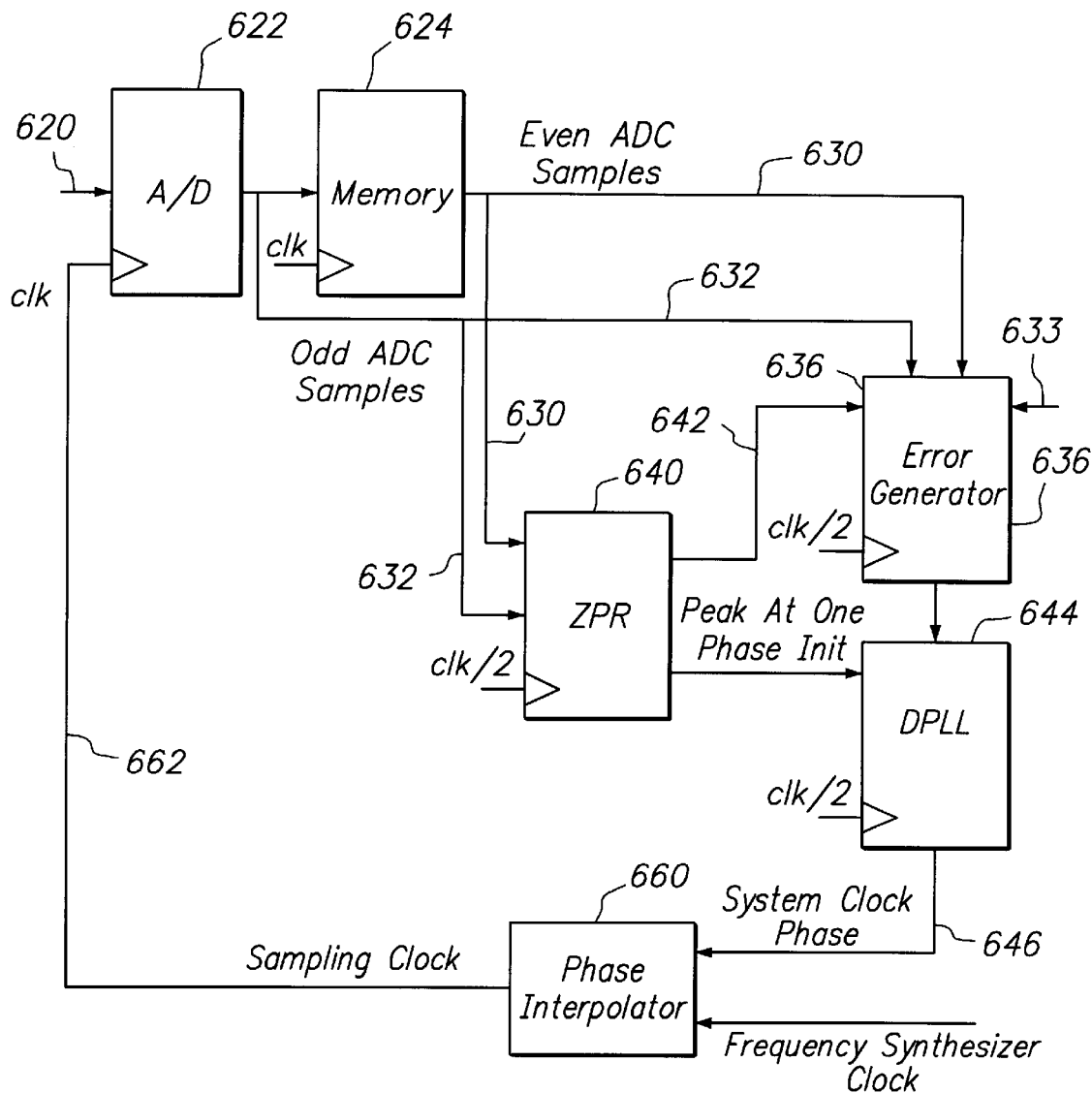
FIG. 6 is a simplified block diagram illustrating deployment of a ZPR circuit within the context of a timing loop in accordance with the present invention.

FIG. 6 is a simplified block diagram showing deployment of the ZPR circuit 640 of the present invention within the context of the timing loop. In FIG. 6, the A/D converter 622 samples analog input signals 620 responsive to a sampling clock signal input via path 662. (This is the same as the sampling clock signal 566 of FIG. 5.) Every other sample value is stored in a memory 624 so as to provide even A/D samples on path 630 and odd A/D samples at 632. The even and odd samples are input to an error generator 636 for comparing the selected sample stream to predetermined ideal preamble pattern peak (and zero) values, input at 633.

Thus the error generator is functionally a digital phase detector. The ideal or expected preamble pattern peak amplitudes input at 633 may be fixed or more likely are subject to adjustment by a gain control loop. One of the even and odd streams of sample values will be closer in phase with the peak values of the incoming sinewave, while the other sample values will be closer to the zero crossings. If the two samples (Even and Odd) are equal then one may be selected to represent the peak value arbitrarily. Initially, however, there is no way for the error generator to determine which (Even or Odd) ADC sample is closer to the peak sample. This selection is controlled by a "Peak At One" control signal via path 642, provided by the ZPR circuit 640 as described below.

The ZPR circuit 640 also receives the even and odd ADC samples 630,632, as well as a one-half rate sample clock signal (clk/2). The ZPR, described in more detail below, provides two outputs: first, a single-bit "Peak At One" signal at path 642 to control which signal sample is compared against zero to generate the phase error signal within the error generator. (The other signal can be compared against the peak value to generate a gain error signal within the error generator, which in turn can be used to control the automatic gain feedback loop.) The other output of the ZPR is the initial phase error signal "Phase Init" which is a digital value (consisting of 6 bits in a presently preferred embodiment). This value is a quickly-acquired estimate of the phase error between the analog input signal 620 and the sampling clock.

The "Phase Init" value is input to the DPLL (Digital Phase Lock Loop) circuit 644. The DPLL includes essentially the loop filter block 530 and the integrate block 550 of FIG. 5, and it outputs a system clock phase value called PHSEL (phase select). The PHSEL value is provided via path 646 to the phase interpolator 660 (shown as 560 in FIG. 5), which in turn adjusts the phase of the reference clock signal 562 to very closely align with the preamble pattern input signals. By way of illustration, the bit time or $T_{cell}$ for some commercial embodiments is typically 3.3 ns, so the preamble sine wave has a period of 4*T or 13.2 ns, corresponding to a frequency of about 75 Mhz. The same clock is aligned in a presently preferred embodiment by phase steps of 1/64 of a Tcell or 51.56 ps. This is the resolution of the phase select PHSEL line, although higher or lower resolution could be used.

Figure 7:
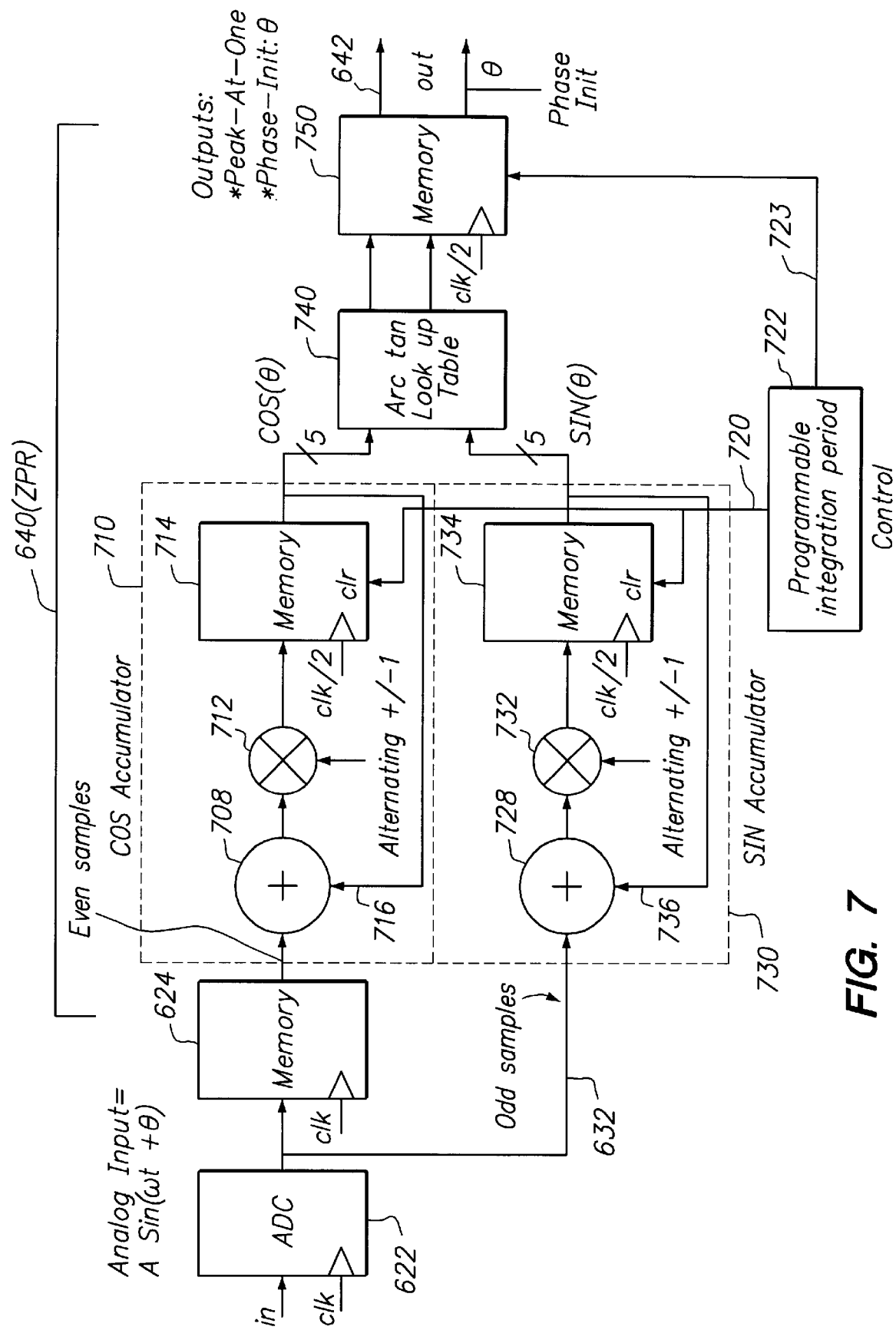
FIG. 7 is a simplified block diagram illustrating an implementation of the ZPR. circuit of FIG. 6.

FIG. 7 shows the ZPR circuit 640 in a presently preferred embodiment in greater detail. The even ADC samples are input to an adder circuit 708 of a cosine (COS) accumulator circuit 710. The COS accumulator 710 and SIN accumulator 730 are preferably implemented as 10-bit digital accumulators. In the COS accumulator, a sum value output by the adder circuit 708 is input to a multiplier circuit 712 which also receives alternating +1 and −1 inputs for toggling the sign of the sum values as they are accumulated. Those skilled in the art will appreciate various simple circuitry for implementing a +/−1 digital multiplier. The multiplier 712 output is input to a memory 714, and stored therein in response to the one-half rate (clk/2) sample clock signal. The accumulated COS value read from memory 714 is fed back to the adder 708 via feedback path 716. In this way, the even ADC sample values are accumulated in the memory 714 for a programmable integration period determined by a control circuit 722, to produce an estimate of the cosine of the phase difference between the input analog signal and the phase of the sampling clock. The control circuit 722 provides a clear signal to the memory via path 720 at beginning of the ZPR integration period.

A SIN (sine) accumulator 730 is similarly arranged to receive and accumulate the odd ADC samples. The odd sample values are input on path 632 into an adder circuit 728. In the SIN accumulator, a sum value output by the adder circuit 728 is input to a multiplier circuit 732 which also receives alternating +1 and −1 inputs for toggling the sign of the sum values as they are accumulated. The resulting product is input to a memory 734, and stored therein in response to the one-half rate (clk/2) sample clock signal. The memory 734 read output is fed back to the adder 728 via another feedback path 736. Thus the odd ADC sample values are integrated in the memory 734, to produce an estimate of the sine of the phase difference between the input analog signal and the phase of the sample clock. The integration period is determined by control circuit 722 as noted above, which also provides the clear signal (clr) to the memory 734 at the end of the ZPR period as well as prior to commencing the integration.

At the end of the programmable integration period (N cycles), the content of the first memory 714, is divided by N and input as a first index or row address to an arctan lookup table 740. The accumulated sine value from memory 734 also is divided by N and then input as the second index or column address to the lookup table. The lookup table provides a corresponding phase angle and the peak-at-one signal, which are then stored in a memory 750, which can be, for example, a register, before being passed on to the DPLL and the error generator. Depending on how the lookup table is implemented, a separate memory/register to hold results may not be needed. It is important to capture the correct output from the lookup after it has settled.

That value is stored at the end of the ZPR integration period, controlled by the control signal 723 from the control logic 722. A representative integration period can be 4, 8, 16, 32 etc. clock/2 cycles. Preferably, this integration period is programmable. For example, to provide for a range of 4, 8, 16 and 32 clk/2 cycles, the choice can be controlled by a 2-bit input control signal. These numbers correspond to 1,2, 4 and 8 preamble input cycles, respectively. Memory 750 provides the Peak-At-One control signal at 642 and the Phase Init signal for input to the DPLL as shown in FIG. 6.

The zero-phase restart methods and circuitry of the present invention can be used to replace most of the analog PLL circuitry of FIG. 2. Virtually all of the analog content, namely blocks 276, 277, 262, 280, 268, 270, 274, 260, 258 are replaced by the phase interpolate and digital integration blocks 550 and 560, respectively of FIG. 5. A synthesizer PLL is still used (262 in FIG. 2), although it is referred to as the reference clock generator in the new FIG. 5.

Theory and Operation

In operation, the phase estimate is calculated as follows. Assuming that the reference clock frequency ("Frequency Synthesizer Clock" in FIG. 6) is near to the analog input signal frequency, we can describe samples of a 2T sinusoidal preamble waveform in terms of trigonometric functions. We arbitrarily selected the even (ADC0) and odd (ADC1) analog to digital converter samples to be represented as the sine and cosine trigonometric functions as:

$$ADC0\ (n)=A*\cos(phi+n\ PI)+\text{noise};$$

$$ADC1\ (n)=A*\sin(phi+n\ PI)+\text{noise}.$$

Where: n is the half-rate sample index; phi is the unknown signal phase; and PI is the well known constant 3.14. Unbiased estimates of the sine and cosine components of phi can be found by the following equations:

$$[A\sin(phi)]+[\text{noise}]=1/N(\text{sum from } i=0 \text{ to } i=N-1 \text{ of } \{(-1)^i(A\sin$$

(phi+iPI)+noise)

[A cos (phi)]+[noise]=1/N (sum from i=0 to i=N-1 of {(-1)^i(A cos (phi+iPI)+noise)

Where phi represents the unknown phase error between the DVCO clock and the input signal; N is the integration period; [ ] indicates the average function; and (-1)^i is minus one raised to the power i. The two summation functions are performed using the two 10-bit digital accumulators 710 and 730 as described above with reference to FIG. 7. Then, once the accumulations have been performed, over the time-period N, the estimates for sine and cosine are produced by dividing the two 10-bit values by N using the left shift operation. The 5 most significant bits of the results of division by N are passed to the arctangent look-up table 740 to calculate an initial phase estimate with a resolution within 1/64 of the input symbol rate. This phase estimate is given by the following two equations:

Initial_phase (A sin(phi), A cos (phi)):

If|A sin(phi)|<|A cos(phi)|,

Initial_phase=(128/PI)*a tan([A sin(phi)]/[A cos(phi)])

else

Initial_phase=-(128/PI)*a tan([A cos(phi)]/[A sin(phi)])

Note: The second equation for the lnitial_phase shown above (after the else statement) appears to be performing a cotangent function (e.g. cotangent=cosine/sine). However since we also shift the phase relationship between the input signal and the reference clock by PI/2, by way of the Peak_at_one function below, it can be shown by trigonometry that this is equivalent to adding PI/2 to phi and thus this second equation is identical to the first equation.

Figure 12:
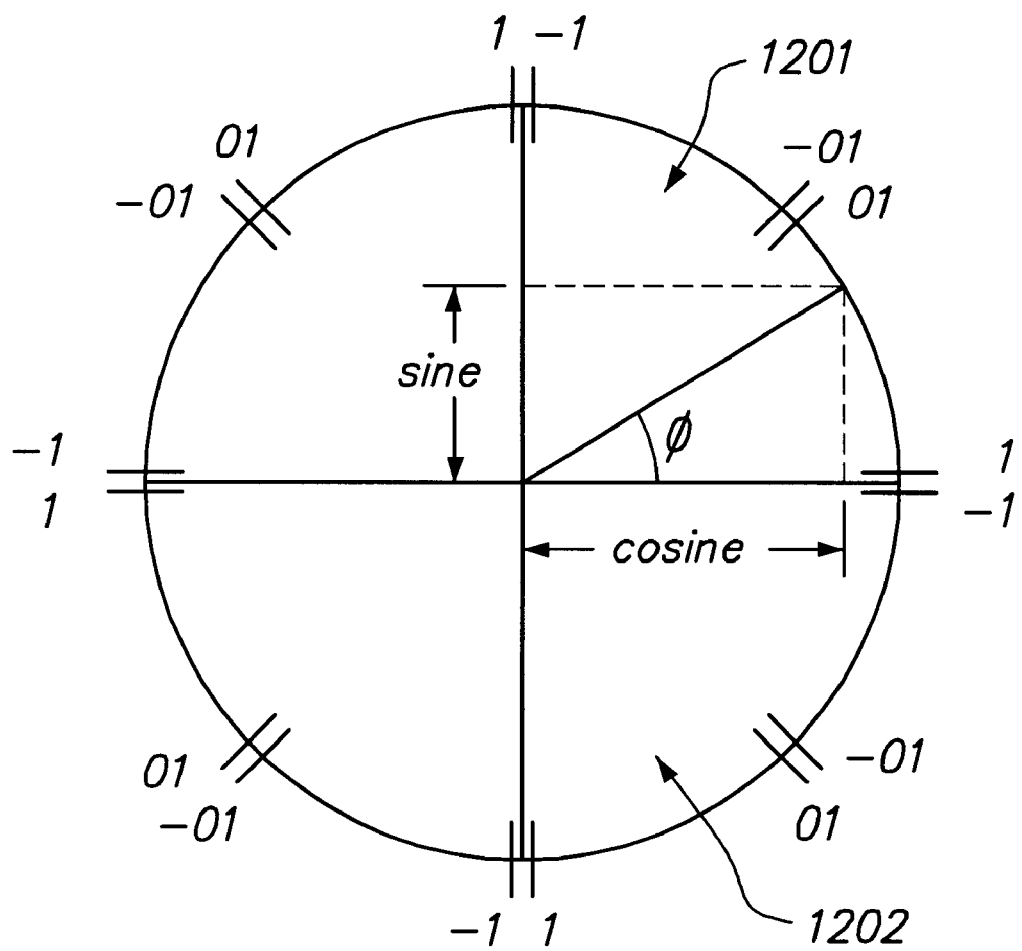
FIG. 12 is a unit circle phase diagram illustrating arrangement of an arctan lookup table, optionally reduced to one-half or one-quarter size.

Some values of the initial phase, as a function of phi, are shown on a unit circle in FIG. 12.

As well as a second signal, Peak_at_one, which is given by the logic relation,

Peak_at_one (A sin(phi), A cos(phi)):

Peak_at_one=|[A sin (phi)]|>=|[A cos(phi)]|

This second (Peak_at_one) signal indicates whether or not the arbitrarily selected even samples (ADC0) will correspond to the zero crossing samples (sine), and the odd samples (ADC1) will correspond to the peak samples (cosine), after the phase adjustment. This signal is then used to select one of the even or odd sample streams to calculate the 6-bit phase error signal based on the equation:

Phase_error(n)=ADC0(n)*SLOPE0(n)+ADC1(n)*SLOPE1(n)

Where the slopes are calculated based on the simple formula:

if Peak_at_one=1,

SLOPE0=0

If ADC0(n-1)>0,

SLOPE1=1

Else,

SLOPE1=1

Else,

SLOPE1=0

If ADC1(n-1)>0,

SLOPE0=-1

Else,

SLOPE0=1

These calculations are carried out in the error generator 636 of FIG. 6.

Due to the symmetry of the look-up table relative to its inputs, the table size (measured in gate count or number of entries) can be significantly decreased at the expense of some additional delay in the phase calculation. One can reduce by half the number of entries in the table ('half-size' design) by forming a new table with only non-negative (or non-positive) cosine (or sine) entries. This corresponds to the use of only the two right quadrants of the unit circle in FIG. 12, 1201, 1202 leaving the phase values unchanged for each cosine-sine pair. One can also reduce by four the number of entries ('quarter-size' design) by forming a new table with only non-negative (or non-positive) cosine and sine entries. This corresponds to the use of only the upper-right quadrant 1201, again leaving the phase values unchanged. All possible 'half-size' or 'quarter-size' tables require the manipulation their inputs and/or outputs (depending on the sign of the sine and cosine terms) to yield the same phase value that the full-size table yields. Two examples of the manipulations required by the 'half-size' and 'quarter-size' tables follow.

Half-size look-up table, non-negative cosine entries only:
Table definition:
   For any cos (phi)>=0:
   Half-size_look-up_table(sin (phi), cos(phi))=
      Initial_phase (sin (phi), cos (phi))
Initial phase estimation:
   cos'=|cos (phi)|
   If sign(cos (phi))=-1:
      Initial phase=Half-size_lookup_table(-sin (phi), cos',
   else
      Initial phase=Half-size_lookup_table( sin (phi), cos')

EXAMPLE 1

Quarter-size look-up table, non-negative cosine and sine entries only:
Table definition:
   For any cos (phi)>=0 and sin (phi)>=0;
   Quarter-size_look-up_table(sin (phi), cos (phi))=
      Initial_phase (sin (phi), cos (phi))
Initial phase estimation:
   cos'=|cos (phi)|and sin'=sin (phi)|
   If (cos (phi) )<0):
      Initial phase=-Quarter-size_look-up_table(sin', cos')
   else
      Initial phase=Quarter-size_look-up_table(sin', cos')

EXAMPLE 2

This ZPR function produces an initial phase error that is a small fraction of the symbol period, allowing for a fast timing acquisition of the magnetic read signal. The initial phase error signal is a function of the following factors: 1) the number of terms in the arctangent table look-up function; 2) the actual frequency difference between the reference clock and the input symbol rate; 3) the interval over which the sine and cosine estimates are integrated; and 4) the number of bits passed between the sine and cosine estimators and the arctangent table look-up. Each of these factors can be controlled digitally to the required precision, and do not depend on integrated circuit manufacturing tolerances. This ZPR function is independent of gain errors due to the ratio performed in the arctangent look-up table.

In a presently preferred commercial embodiment, the lookup table output is 6-bits. The two inputs (indices) to the table have 5-bit resolution each. Thus the table has 32×32 entries, if not folded, and each entry has a 6-bit phase value. The half-size table has 32×16 entries (16 cosine entries for each of 32 sine entries). Various memory technologies are well known for implementing the tables.

Figure 8A:
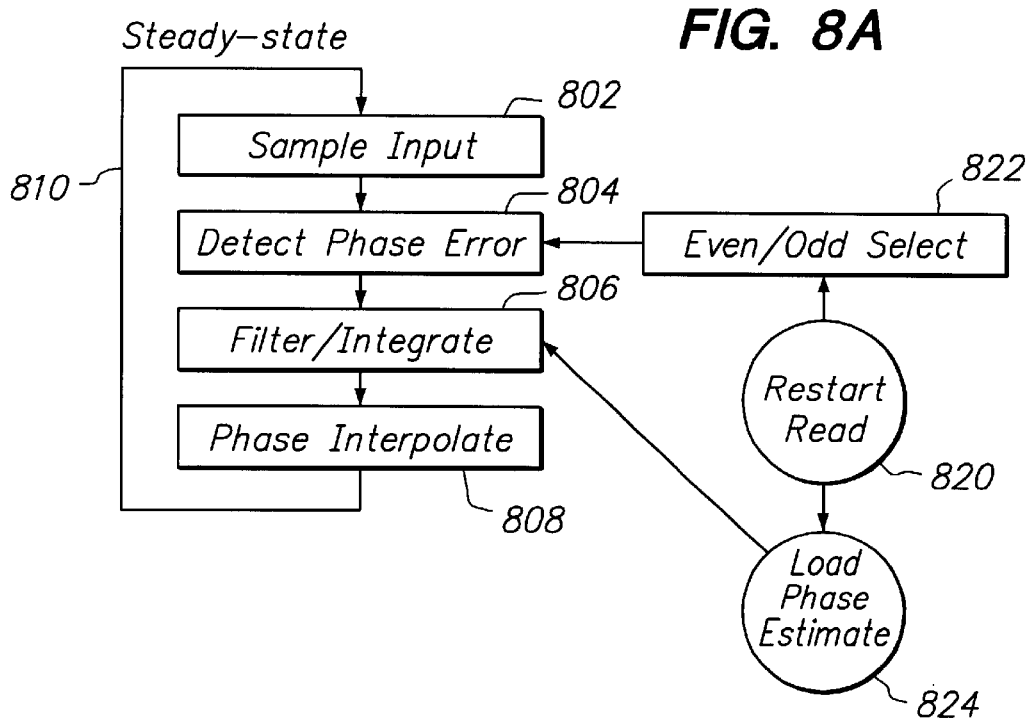
FIG. 8 is a flow chart of a method of speeding timing acquisition in accordance with the present invention.

FIG. 8 is a flowchart summarizing the operations described in detail above. FIG. 8A describes operation of the interpolating digital timing loop of the type illustrated in FIG. 5. Referring to FIG. 8A, the analog input signal is sampled, step 802, and the samples are compared to the phase of the sampling clock in the "detect phase error" step 804. This phase error information is filtered and integrated, step 806, in order to form an error signal which we have called phase select (PHSEL). The phase select value is input to the digital phase interpolator to adjust the sampling clock phase, step 808, and this process is repeated in a closed loop as indicated by path 810. This is a normal steady state tracking operation. At the beginning of a servo or data read operation, rapid synchronization to a preamble pattern is achieved according to the present invention, as indicated beginning with the restart initialization step 820. At restart time, a selection is made as between the even and odd ADC samples indicating which one of them is closest in phase to the sample clock signal, step 822. That selection is used to control the phase detector (error generator) to select which one of the ADC sample streams to use for tracking. The restart process also includes determining an initial phase estimate, step 824, and inserting that estimate into the integrator of the digital control loop. The integrator, in turn, passes that initial phase estimate to the digital phase interpolator for adjusting the phase of the sample clock signal.

Figure 8B:
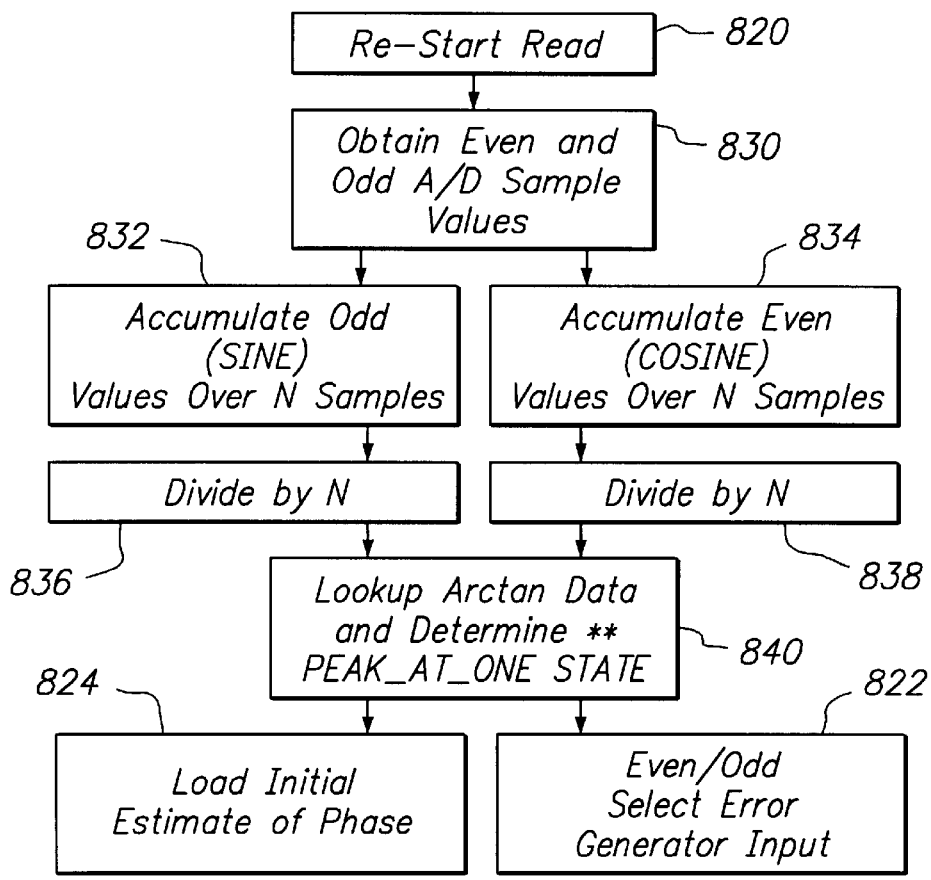

FIG. 8B shows the restart operation in greater detail. The restart operation again begins at step 820, and even and odd ADC sample values are obtained in step 830. Even and odd samples are accumulated over N samples (step 834 and 832, respectively). At the end of the selected integration period, the accumulated even samples are divided by N, step 838, resulting in the cosine(phi) estimate; similarly, the accumulated odd samples are divided by N, step 836, resulting in the sine(phi) estimate. These estimates are inputs to the arctan table, step 840, and are also used to determine the state of the "Peak_at_one" logic signal. The state of the peak-at-one signal is used to select either the even or odd sample streams, in step 822, for input to the error generator while the initial estimate of phase resulting from the arctan lookup is loaded into the timing loop (integrator), step 824. The steady state timing loop operation illustrated in FIG. 8A is ongoing during either a servo or data read operation, but it is reinitialized or restarted each time a read operation begins, indicated at step 820 in the flow diagrams.

Figure 9:
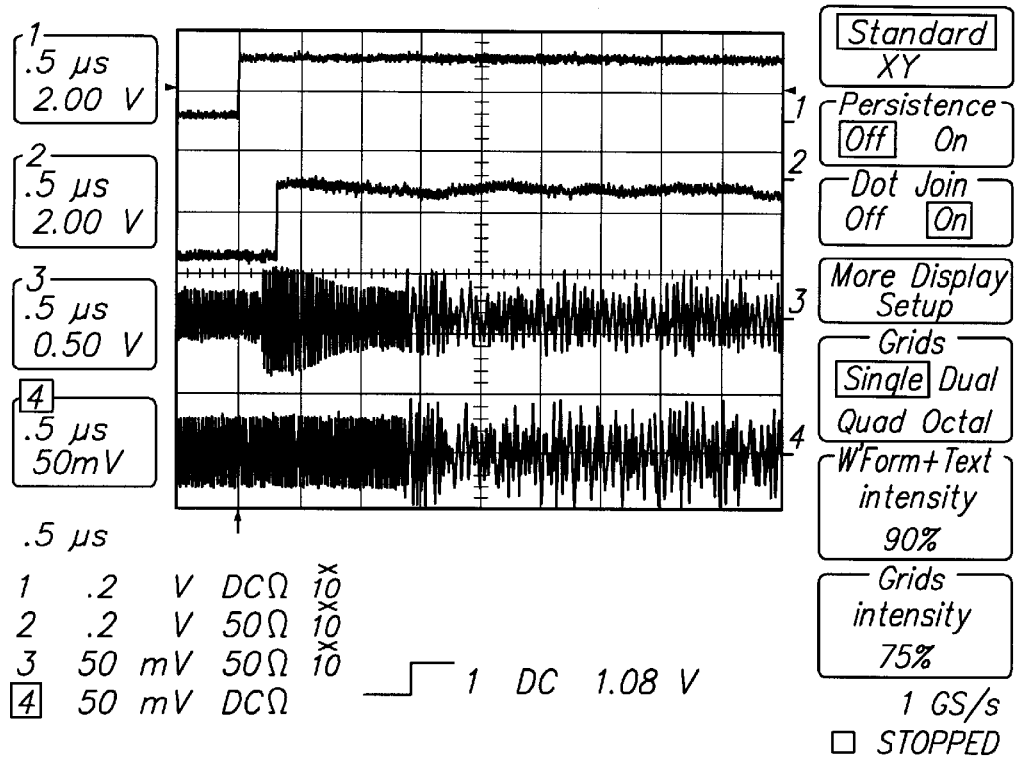
FIG. 9 is a simulation plot of waveforms illustrating operation of one implementation of the ZPR circuit of the present invention.
Figure 10:
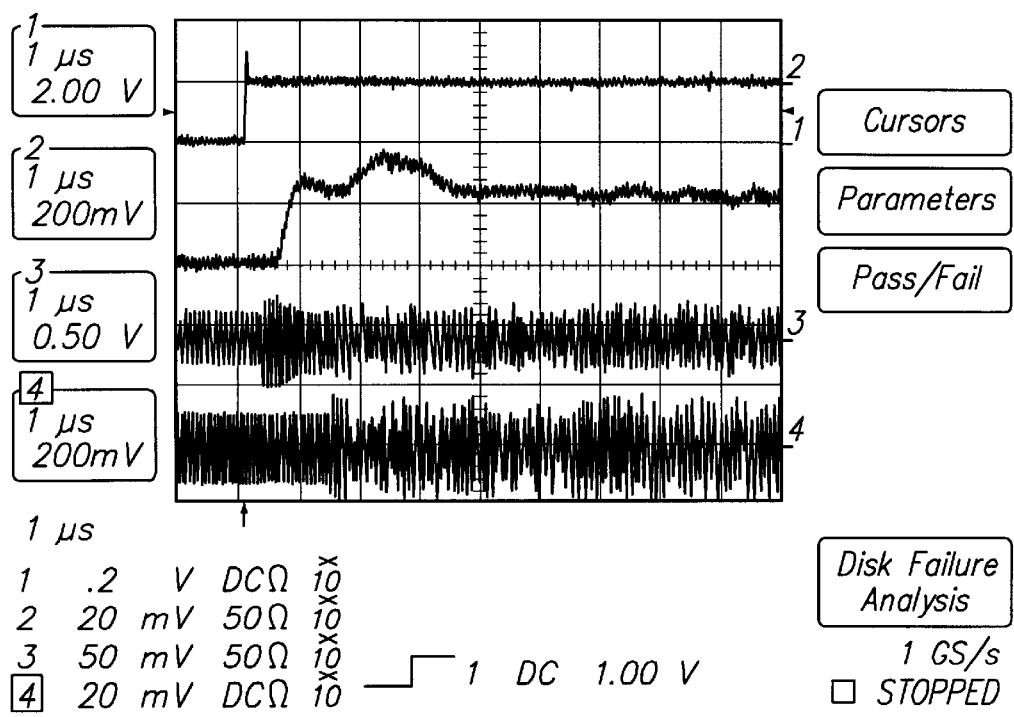
FIG. 10 is another simulation plot of waveforms showing operation of a timing loop without benefit of the present invention.

Referring to FIGS. 9 and 10, actual measurement data from developmental integrated circuit chip evaluations demonstrate the effectiveness of the invention. FIG. 9 illustrates operation of the timing circuitry taking advantage of the digital ZPR circuitry described herein, while FIG. 10 shows operation of the same circuitry with the ZPR feature disabled. The phase signal which is second from the top in both figures can be observed to settle with ZPR turned on, as shown in FIG. 9, in approximately 0.25 microseconds. In FIG. 10, with ZPR turned off, the settling time of the phase signal is approximately 3.5 microseconds. (Note the difference in the time access: in FIG. 9, the horizontal scale is 0.5 microseconds per division while in FIG. 10, the horizontal scale is 1 microsecond per division.)

Figure 11:
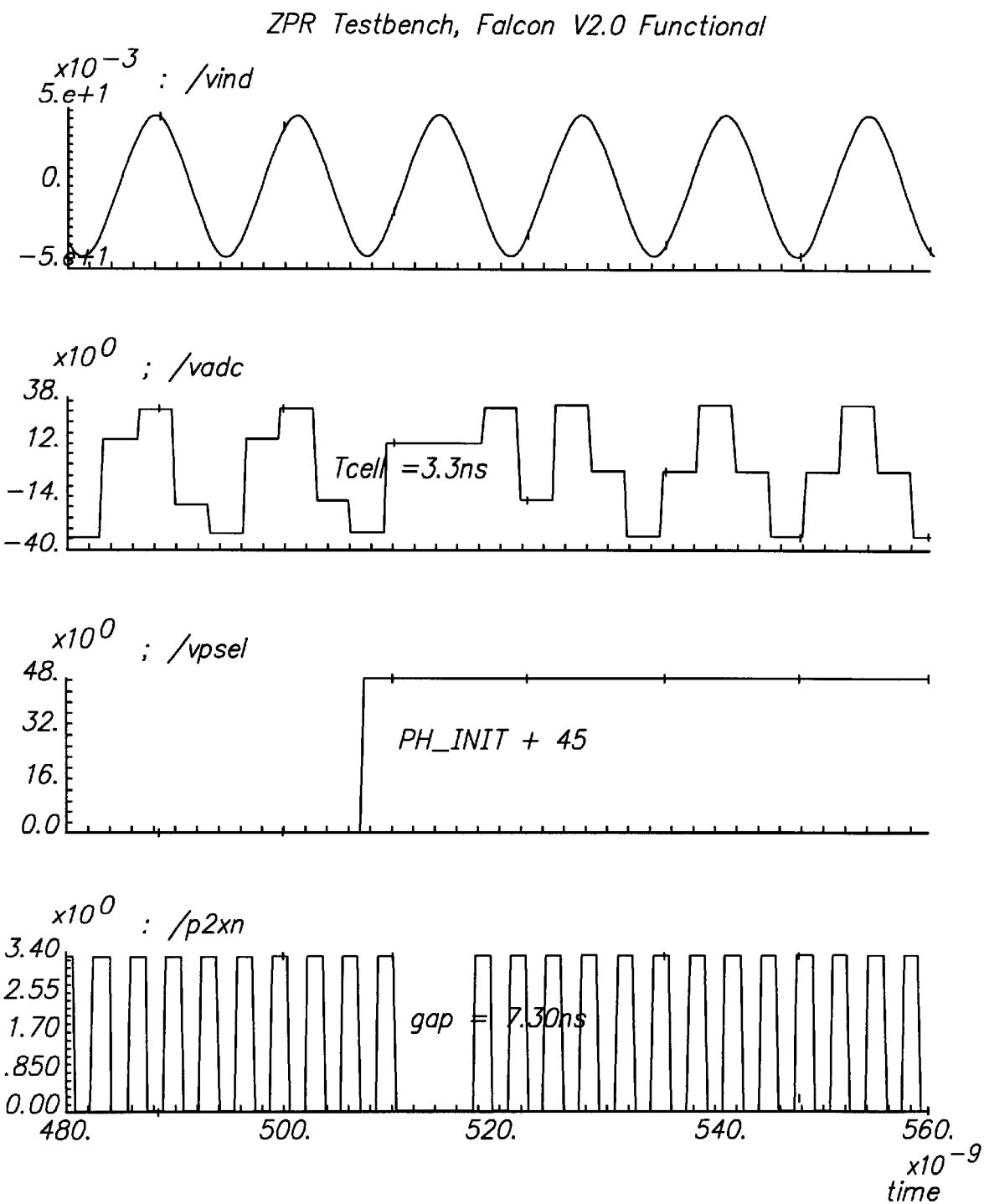
FIG. 11 is a plot of waveforms showing operation of the invention as designed for one commercial embodiment.

FIG. 11 is a series of plots again illustrating operation of the invention. In FIG. 11, the first plot shows a general sine wave input signal such as that expected from a preamble pattern. The second plot shows the sample values provided by the ADC. The third plot shows the initial phase estimate (PHINIT). It can be observed that immediately after the phase estimate is acquired (PHINIT goes to value of 45), the ADC sample values reflect close alignment to the sine wave input signal.

It will be obvious to those having skill in the art that many changes may be made to the details of the above-described embodiment of this invention without departing from the underlying principles thereof. The scope of the present invention should, therefore, be determined only by the following claims.

What is claimed is:

1. An improved method of fast timing acquisition of a preamble pattern input signal in a magnetic read channel, comprising the steps of:
   providing a phase-lock loop circuit having a digital VCO that provides as its output a sampling clock signal arranged for sampling the input signal;
   at the beginning of a read operation, providing a reference clock signal to the digital VCO and sampling the input signal in response to the reference clock signal;
   estimating an initial phase of the input signal based on said sampling step, including
      digitally integrating an even series of samples of the input signal to form an estimated cosine value;
      digitally integrating an odd series of samples of the input signal to form an estimated sine value; and then
      determining the initial phase estimate by applying an arctangent function to the estimated sine and cosine values;
   adjusting a phase of the digital VCO, and thereby adjusting a phase of the sampling clock signal, responsive to the estimated initial phase of the input signal; and then
   commencing normal operation of the phase-lock loop using the adjusted sampling clock signal, rather than the reference clock signal, for sampling the input signal.

2. A method according to claim 1 wherein the digital VCO includes an integrator circuit for estimating the phase of the input signal and a phase interpolator circuit to effect said adjusting the phase of the sampling clock signal.

3. A method according to claim 2 wherein said estimating the initial phase of the input signal includes forming a digital value indicative of the initial phase of the input signal, and said adjusting the phase of the digital VCO includes providing said digital value to the phase interpolator circuit to adjust the phase of the sampling signal by an amount responsive to the digital value.

4. A method according to claim 1 wherein said digitally integrating steps include digitally summing the corresponding series of input signal sample values over a selected integration period.

5. A method according to claim 4 wherein the integration period is programmably selectable.

6. A method according to claim 1 wherein said applying the arctangent function includes providing a look-up table of arctangent values addressable according to the estimated sine and cosine input values.

7. A method according to claim 6 wherein the look-up table comprises a half-size table comprising only a selected one of only non-negative cosine or sine entries.

8. A digital timing loop circuit for use in a magnetic read channel comprising:
   an analog to digital converter means for sampling an analog input signal responsive to a sampling clock signal;
   a memory means for storing alternate samples from the analog to digital converter means so as to form even and odd streams of ADC samples;
   means for forming an initial phase estimate value responsive to the even and odd ADC sample streams, including a first digital accumulator for accumulating the even stream of ADC values and a second digital accumulator for accumulating the odd stream of ADC values; and
   digital phase interpolating means for shifting the sampling clock signal responsive to the initial phase estimate value at the beginning of the read operation so as to bring the sampling clock signal into alignment with the said analog input signal without halting the sampling clock.

9. A digital timing loop circuit according to claim 8 and further comprising means for dividing the accumulated even and odd ADC values in accordance with a selected integration period over which the ADC values were accumulated, the integration period consisting of an integer number of cycles of the sample clock signal.

10. A digital timing loop circuit according to claim 8 and further comprising:
    means for selecting one of the even and odd ADC sample streams as closest in phase to a predetermined preamble pattern;
    error generating means for comparing the selected ADC sample stream values to predetermined expected peak values of the preamble pattern to form an error signal;
    means for coupling the error signal to the digital phase interpolating means for tracking.

11. A digital timing loop circuit for synchronizing a magnetic recording read channel comprising:
    an ADC for sampling an analog input signal responsive to a sampling clock signal;
    a phase detector for comparing a phase of the analog input signal as reflected in the ADC sample stream to the phase of the sampling clock signal to form a phase error signal;
    an integrator circuit for continually summing the phase error signal to form a phase select signal;
    a phase interpolator for digitally adjusting the phase of a reference clock signal that provides the sampling clock signal, responsive to the phase select signal, for aligning the sampling clock signal to the analog input signal during steady state operation; and
    a digital zero-phase restart circuit coupled to the integrator to adjust the phase select signal based upon an initial phase estimate at the beginning of a read operation, wherein the digital zero-phase restart circuit includes means for determining the initial phase estimate by an arctan lookup method based on even and odd ADC sample streams.

12. A zero-phase restart (ZPR) circuit for use in a magnetic read channel receiving first and second series of digital sample values to provide an initial phase estimate value, the ZPR circuit comprising:
    a first accumulator for accumulating the first digital sample values over a selected integration period to form an accumulated cosine value;
    a second accumulator for accumulating the second digital sample values over the same selected integration period to form an accumulated sine value; and
    an arctan lookup table coupled to the first and second accumulators to provide the initial phase estimate value as an arctan function of the accumulated sine and cosine values.

13. A zero-phase restart (ZPR) circuit according to claim 12 wherein the first and second accumulators each includes means for dividing the accumulated sine and cosine values, respectively, by a number corresponding to the selected integration period.

14. A zero-phase restart (ZPR) circuit according to claim 13 wherein the arctan lookup table comprises logic circuits.

15. A zero-phase restart (ZPR) circuit according to claim 13 wherein the arctan lookup table comprises a memory for storing phase estimate values.

16. A zero-phase restart (ZPR) circuit according to claim 13 wherein the arctan lookup table includes a read-only memory for storing phase estimate values.

17. A zero-phase restart (ZPR) circuit according to claim 13 wherein the arctan lookup table implements a half-size design by storing a selected one of either non-negative or non-positive input values.

18. A zero-phase restart (ZPR) circuit according to claim 12 and further comprising a control circuit for determining the selected integration period; the control circuit providing a control signal coupled to the first and second accumulators for clearing the accumulators at the end of the selected integration period.

19. A zero-phase restart (ZPR) circuit according to claim 18 wherein the control circuit is programmable so as to allow selection of the integration period under software control.

20. A zero-phase restart (ZPR) circuit according to claim 18 wherein the control circuit is programmable so as to allow selection of the integration period as a selected integer multiple number of cycles of the sampling clock signal.

21. A zero-phase restart (ZPR) circuit according to claim 18 and further comprising a register for storing the an initial phase estimate value provided by the arctan lookup table.

22. A zero-phase restart (ZPR) circuit for use in a magnetic read channel receiving first and second series of digital sample values ADC0, ADC1 to provide an initial phase estimate value, the ZPR circuit comprising:
    a first accumulator for accumulating the first digital sample values over a selected integration period to form an accumulated cosine value;
    a second accumulator for accumulating the second digital sample values over the same selected integration period to form an accumulated sine value; and
    a Peak_at_one logic circuit for comparing the accumulated sine value to the accumulated cosine value and providing a Peak_at_one logic signal indicating whether or not the first series of digital sample values (ADC0) correspond to zero crossing samples (sine), and the second series of digital sample values (ADC1) correspond to peak samples (cosine).

23. A zero-phase restart (ZPR) circuit according to claim 22 and further comprising an arctan lookup table coupled to the first and second accumulators to provide the initial phase estimate value as an arctan function of the accumulated sine and cosine values.

24. A digital timing loop circuit for use in a magnetic read channel comprising:

an analog to digital converter means for sampling an analog input signal responsive to a sampling clock signal;

a memory means for storing alternate samples from the analog to digital converter means so as to form even and odd streams of ADC samples representing orthogonal sine and cosine components of said analog input signal;

means for forming an initial phase estimate value responsive to the even and odd ADC sample streams; and digital phase interpolating means for shifting the sampling clock signal responsive to the initial phase estimate value at the beginning of the read operation so as to bring the sampling clock signal into alignment with the said analog input signal without halting the sampling clock.

25. A digital timing loop circuit for use in a magnetic read channel comprising:

an analog to digital converter means for sampling an analog input signal responsive to a sampling clock signal;

a memory means for storing alternate samples from the analog to digital converter means so as to form even and odd streams of ADC samples;

means for forming an initial phase estimate value responsive to the even and odd ADC sample streams;

digital phase interpolating means for shifting the sampling clock signal responsive to the initial phase estimate value at the beginning of the read operation so as to bring the sampling clock signal into alignment with the said analog input signal without halting the sampling clock; and a multiplier for selectively multiplying alternate samples from the ADC by +1 or −1 to store in said memory means, so as to form said even and odd streams of the ADC samples representing orthogonal sine and cosine components of said analog input signal.

* * * * *